US012523072B2

(12) United States Patent
Bauer et al.

(10) Patent No.: US 12,523,072 B2
(45) Date of Patent: Jan. 13, 2026

(54) DOOR LOCK MECHANISM FOR DOMESTIC APPLIANCES

(71) Applicant: emz-Hanauer GmbH & Co. KGaA, Nabburg (DE)

(72) Inventors: Matthias Bauer, Schmidgaden (DE); Tobias Neugebauer, Regensburg (DE); Albert Dirnberger, Neunburg vorm Wald (DE); Georg Spießl, Altendorf (DE); Dominik Walz, Nabburg (DE); Roland Schrödel, Reichenschwand (DE)

(73) Assignee: EMZ-HANAUER GMBH & CO. KGAA, Nabburg (DE)

( * ) Notice: Subject to any disclaimer, the term of this patent is extended or adjusted under 35 U.S.C. 154(b) by 49 days.

(21) Appl. No.: 18/810,085

(22) Filed: Aug. 20, 2024

(65) Prior Publication Data

US 2025/0075541 A1 Mar. 6, 2025

(30) Foreign Application Priority Data

Aug. 29, 2023 (DE) ........................ 102023123152.9

(51) Int. Cl.
*E05C 3/12* (2006.01)
*A47L 15/42* (2006.01)

(52) U.S. Cl.
CPC ............ *E05C 3/12* (2013.01); *A47L 15/4259* (2013.01)

(58) Field of Classification Search
CPC .............................. E05C 3/12; A47L 15/4259
USPC ........................................................... 292/11
See application file for complete search history.

(56) References Cited

U.S. PATENT DOCUMENTS

| | | | | |
|---|---|---|---|---|
| 9,101,259 | B2 * | 8/2015 | Dirnberger | A47L 15/4259 |
| 11,889,965 | B2 * | 2/2024 | Dirnberger | A47L 15/4259 |
| 2002/0073752 | A1 * | 6/2002 | Dirnberger | A47L 15/4259 70/266 |
| 2016/0029872 | A1 * | 2/2016 | Kim | F16J 15/061 312/228 |
| 2017/0188785 | A1 * | 7/2017 | Park | A47L 15/4259 |
| 2018/0163433 | A1 * | 6/2018 | Schmidt | A47L 15/4259 |
| 2018/0292094 | A1 * | 10/2018 | Park | F24C 15/023 |
| 2019/0178001 | A1 * | 6/2019 | Esterle | H05B 6/6417 |
| 2021/0348434 | A1 * | 11/2021 | Walz | E05F 15/616 |
| 2021/0381292 | A1 * | 12/2021 | Drzazga | A47L 15/4259 |

FOREIGN PATENT DOCUMENTS

| | | | |
|---|---|---|---|
| DE | 102021104747 | A1 | 9/2022 |
| KR | 1020170137518 | A | 12/2017 |
| WO | 2022240113 | A1 | 11/2022 |

* cited by examiner

*Primary Examiner* — Nathan Cumar
(74) *Attorney, Agent, or Firm* — Tarolli, Sundheim, Covell & Tummino LLP

(57) ABSTRACT

A door lock mechanism for domestic appliances with a guide element which can be engaged behind by at least one pivotable, resiliently mounted lever arm for locking a door of the domestic appliance is disclosed. This door lock mechanism is characterized by a displaceably mounted locking element which, depending on its movement position, can block or release the at least one lever arm in a pivoting position.

19 Claims, 3 Drawing Sheets

DOOR LOCK MECHANISM FOR DOMESTIC APPLIANCES

CROSS-REFERENCE TO RELATED APPLICATIONS

This patent application claims the benefit of and priority to German Patent Application No. 102023123152.9, filed on Aug. 29, 2023, which is herein incorporated by reference in its entirety.

FIELD OF THE DISCLOSURE

The invention relates to a door lock mechanism for domestic appliances, in particular for dishwashers, with a guide element which can be engaged behind by at least one pivotable, resiliently mounted lever arm for locking a door of the domestic appliance. The invention further relates to a method for locking and unlocking the door of a household appliance with such a door lock mechanism and a preferred use of the door lock mechanism for a dishwasher.

BACKGROUND

A door lock mechanism for domestic appliances is usually arranged on the container of a dishwasher, for example. With such door lock mechanisms, a closing force must first be applied up to a turning point. From this turning point, the door lock mechanism pulls the door into the closed state.

The US patent specification U.S. Pat. No. 9,101,259 B2 discloses a door lock mechanism which comprises lever arms for securely locking the door of a dishwasher, which are pushed apart by a deflection surface and close again behind it.

The German patent application DE 10 2021 104 747 A1 discloses a mechanism for the door of an electric domestic appliance that can be opened automatically by a handle that is separate from the lock-opening mechanism and decoupled from the latter in terms of movement.

SUMMARY

The door lock mechanisms known from the state of the art do not allow the door of a domestic appliance to be closed with little effort while still locking the door securely and reliably.

One task of the present invention is to simplify the operation of the door of a domestic appliance and, in particular, to reduce the closing force to be applied without, from a turning point in the application of force, impairing the pulling force for closing the door.

The problem is solved by a door lock mechanism according to the characterizing part of claim 1, with a displaceable mounted locking element which, depending on its movement position, can block or release the at least one lever arm in a pivoting position, so that in a first movement position of the guide element the at least one lever arm contacts a rising guide of the guide element against a closing movement direction of the guide element closer to its upper end than to its lower end, and in a second movement position of the guide element, the at least one lever arm contacts the guide element even closer to the upper end of its rising guide, a gap is formed between the at least one lever arm and the locking element, and in a third movement position of the guide element, the at least one lever arm contacts a gap of the guide element falling against the closing movement direction of the guide element, wherein the locking element is displaceable by the guide element in the second and/or in the third movement position.

A key point of the door lock mechanism according to the invention is that the at least one lever arm only comes into contact with the guide element shortly before a turning point of the closing forces to be applied. A user therefore no longer has to apply force to the guide element in order to work against the resilience of a lever arm along the entire rising guide. This is because the lever arm is set back against its spring by the locking element and blocked so that it only comes into contact with the guide element near the upper end of the rising guide (i.e., shortly before the turning point of the closing forces to be applied). At this point, however, only a small force is sufficient to overcome the turning point and trigger an automatic rear engagement of the guide element, in which a lever arm, driven by its suspension, slides down the falling guide and pulls it towards it and grips it, thus locking the door lock mechanism. During this final movement of a lever arm, the locking element is displaced with the help of the guide element in such a way that the blockage of a lever arm is cancelled. However, such unlocking can also be initiated in the second movement position of the guide element if a blocking surface must first be completely overcome by the third movement position. Due to the low actuating force of the user, such a door lock mechanism is also referred to as a “soft close.” The sub-claims comprise preferred embodiments of the door lock mechanism according to the invention.

According to an advantageous embodiment of the door lock mechanism according to the invention, a release of the at least one lever arm is provided when the guide element moves from the second to the third movement position, and a blocking of the at least one lever arm is provided when the guide element moves from the second to the first movement position. On the one hand, this ensures blockage-free engagement behind the guide element when the door lock mechanism is closed. Conversely, a force-reduced opening of the door lock mechanism corresponding to the closing is possible, as the lever arm is blocked again and positioned friction-free along the rising guide. This supports both force-reduced closing and opening of the door lock mechanism.

The at least one lever arm preferably has a stop located approximately centrally in the longitudinal direction of the lever arm and projecting in the direction of the locking element for abutment against the locking element. When the locking element is displaced, the at least one lever arm is set back against the locking element by the projecting height of the stop and blocked in the set-back position, making it particularly easy to adjust the lever arm to the rising guide. Preferably, the stop is provided with a lead-in chamfer for the locking element, along which the locking element can slide and block the at least one lever arm in a pivoted position. Alternatively or additionally, however, the locking element can also be provided with such a lead-in chamfer in order to fulfil this function. In any case, a simple motion coupling between the locking element and the lever arm can be realised.

A particular advantage arises when the locking element is spring-mounted against the guide element. This is because the locking element can be coupled in a simple and reliable manner with the guide element and at the same time with a lever arm. Preferably, the resilient force of the at least one lever arm is selected to be greater than the resilient force of the locking element. This supports force-reduced closing and opening of the door mechanism without reducing its closing force. The closing force of a lever arm can be realised by a compression spring and/or a tension spring.

A movement coupling of the locking element can preferably be realised via a magnetic connection with the guide element, whereby the locking element is equipped with or without resilience. Such a coupling is easy to realise and allows the locking element to be coupled and moved to block and release a lever arm depending on the movement of the guide element.

In a further embodiment of the door lock mechanism according to the invention, it is provided that an angle of inclination of the rising guide is smaller than an angle of inclination of the falling guide. In this context, the angle of inclination of the rising guide is to be understood as the included angle between the rising guide and a longitudinal axis of the guide element. The angle of inclination of the falling guide should be understood as the included angle between the falling guide and the longitudinal axis of the guide element. If the angle of inclination of the rising guide is smaller than the angle of inclination of the falling guide, the force required to close the door lock mechanism is reduced, while the pulling force required to lock the door lock mechanism is increased. This is because the user only has to apply a small amount of force to push the guide element against the lever arm resting against the flat rising guide up to the turning point of the force application, and from the turning point onwards, the sharply falling guide, in contrast, allows a particularly high locking and pulling force of a lever arm. Ideally, an included angle between the rising guide and the falling guide is between 90° and 130°.

In a particularly preferred embodiment of the door lock mechanism according to the invention, two lever arms are provided which can be pivoted about respective pivoting axes running parallel to each other, thus enabling a particularly powerful and therefore more secure and reliable locking of the door lock mechanism. This is because in this case, for example, the guide element is gripped from two opposite sides, although only a single locking element arranged between the two lever arms can be provided.

For motion coupling of the guide element with the locking element, it is preferable if the guide element has a projection, in particular a plunger. The length of the plunger can be used to set the motion coupling, for example, so that when the turning point of the force application is exceeded (i.e., when a lever arm contacts the falling guide of the guide element and the locking process takes place), the plunger contacts the locking element and moves together with the guide element in order to remove a blockage of a lever arm. This allows a lever arm to slide down along the falling guide and engage behind the guide element and lock it. However, a length of the plunger can also be selected so that a movement coupling of the guide element with the locking element already occurs in the second movement position of the guide element, for example if the unlocking of a lever arm up to the third movement position of the guide element requires a pre-travel distance of the locking element in order to completely overcome a locking surface.

In a preferred embodiment of the door lock mechanism according to the invention, the guide element can have a polygonal, in particular triangular or quadrangular, in the latter case preferably diamond-shaped cross-section, or a round or semi-circular cross-section. In particular, a diamond-shaped cross-section allows for a different choice of inclination angles in order to design the contact of a lever arm on a flat rising guide and a desired setting of a locking force behind the turning point of the force application on a steeply falling guide in accordance with the invention.

The present problem is also solved by a method according to claim 13. An essential point of the method according to the invention is that, compared to the prior art, no additional procedural steps or operating elements, such as an additional push button, are required for a "soft close" operation of the door of a domestic appliance, and the user benefits from a usual but less force-requiring operation of the appliance with the same locking properties. The sub-claims include preferred embodiments of the door lock mechanism according to the invention.

In order to achieve a less force-intensive and at the same time secure opening and closing of the door of a domestic appliance, it is advantageous if, by moving the locking element, the at least one lever arm is released when the door lock mechanism is closed and blocked when the door lock mechanism is opened.

Due to the space-saving and simple realisation of the door lock mechanism according to the invention, it is intended to be used in particular for domestic appliances with a high frequency of use, especially on the doors of dishwashers.

BRIEF DESCRIPTION OF THE DRAWINGS

Further advantages, objectives and features of the present invention are explained with reference to the following description of the attached figures. Similar components may have the same reference signs in the various embodiments. The figures show:

FIG. 1*e* the functional diagram of FIG. 1*a*, in which the guide element is in a third movement position.

DETAILED DESCRIPTION

Figure 1A:
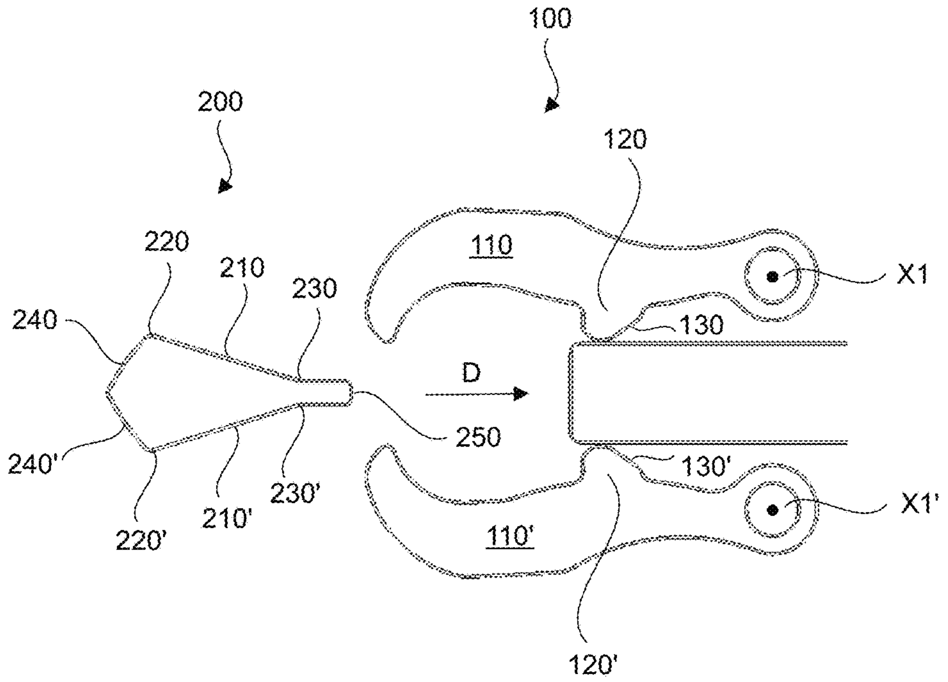
FIG. 1*a* a functional diagram of a door lock mechanism according to the invention with a guide element just before insertion between two lever arms.

FIG. 1 shows a functional diagram of a door lock mechanism 100 according to the invention with a guide element 200 shortly before insertion between two lever arms 110, 110'. The guide element 200 shown is, for example, that of a door of a dishwasher which is about to close against its housing. The door lock mechanism 100 is mounted on the container of the dishwasher, (i.e., not inside it).

The guide element 200 here has a diamond-like cross-sectional shape, the respective rising guides 210, 210' of which run counter to a closing movement direction D (direction) from a lower end 230, 230' to an upper end 220, 220', which at the same time represents the transition to falling guides 240, 240' in the opposite direction to the closing movement direction D. The rising guides 210, 210' transition in the closing movement direction to an elongated plunger 250, which can establish a movement coupling between guide element 200 and a locking element 300.

The two lever arms 110, 110' are spring-mounted on respective pivoting axes X1, X1', which are offset parallel to each other, and have an approximately central stop 120, 120', which rests against the locking element 300. The locking element 300 is displaceably spring-mounted along its longitudinal direction against lead-in chamfers 130, 130'.

Via the respective lead-in chamfers 130, 130', the locking element can reset the lever arms 110, 110' during its movement from right to left and lock them against a closing pincer movement. Before the guide element 200 is inserted when the door is closed, the lever arms 110, 110' both rest against the locking element 300, but are under spring compression and/or spring tension towards each other.

In principle, the door lock mechanism 100 shown is constructed as a mirror image along a horizontal longitudinal axis, but this does not necessarily have to be the case. In particular, a door lock mechanism according to the invention can also be constructed merely from a single lever arm 110 and, for example, a triangular guide element. It is of course also conceivable to use a spherical or hemispherical guide element instead of a rectangular guide element. What should be important below is the basic method of first resetting and locking the lever arm to close the door lock mechanism and then unlocking it again to lock the door lock mechanism and proceeding in reverse order to open the door lock mechanism.

Figure 1B:
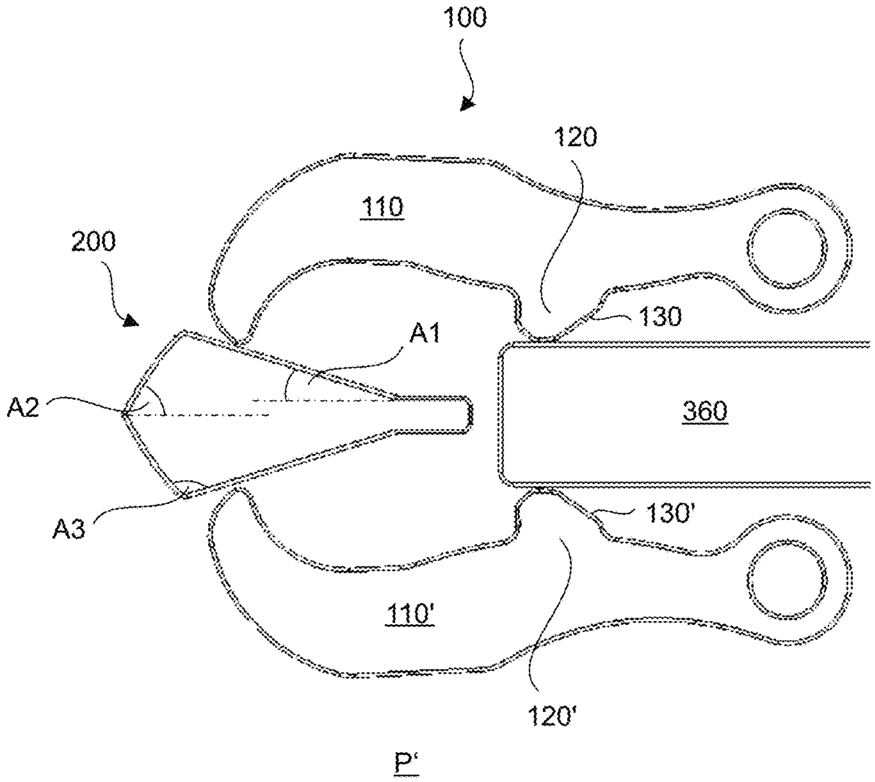
FIG. 1*b* the functional diagram of FIG. 1*a*, in which the guide element is in a first movement position.

FIG. 1*b* shows the functional diagram of FIG. 1*a*, in which the guide element 200 is in a first movement position P1 (Position 1), in which the lever arms 110, 110' contact the rising guides 210, 210' near their upper ends 220, 220'. The locking element 300 thus ensures that the lever arms 110, 110' are set back so far that no force is required to move them along a long distance of the rising guides 210, 210'. In this position, the locking element 300 is still unaffected by the plunger 250.

To reduce the force required by a user to move the guide element 200 in the further course of the closing process, an angle of inclination A1 (Angle 1) of the rising guides 210, 210' can be selected to be significantly smaller than the angle of inclination A2 (Angle 2) of the falling guides 240, 240'. However, there is a limit where an overall length of the door lock mechanism 100 eventually encounters size limitations for a dishwasher. The angle A3 (Angle 3) included between the rising and falling guides 210, 210' and 240, 240' results from the subtraction of the angles A1 and A2 from the sum of all angles in a triangle (180°) and is ideally between 90° and 120° in order to ensure reliable sliding down and pulling up of the guide 200 by the lever arms 110, 110'.

Figure 1C:
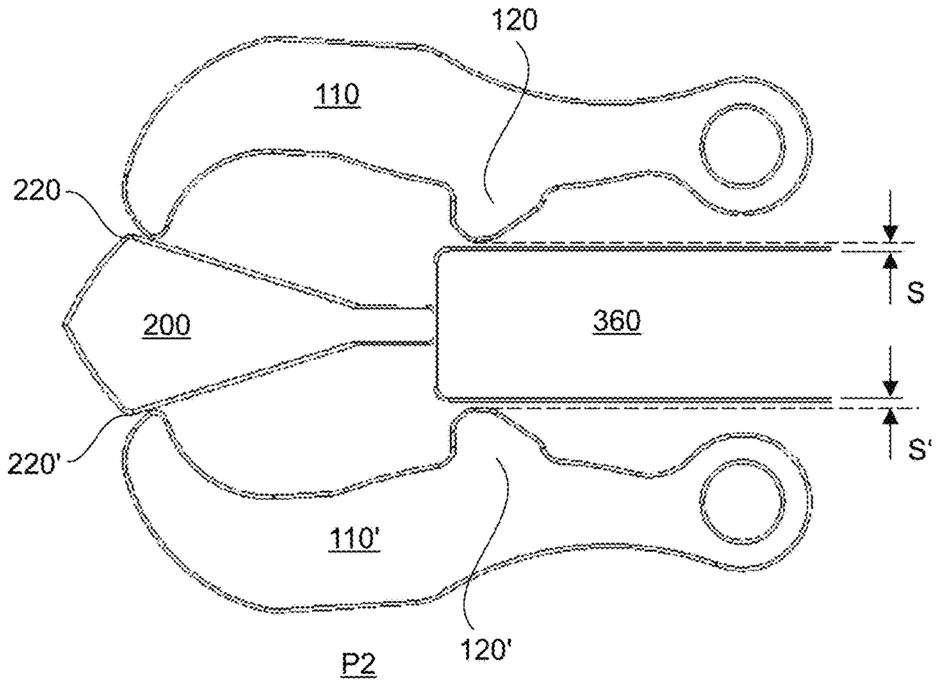
FIG. 1*e* the functional diagram of FIG. 1*a*, in which the guide element is in a second movement position.
FIG. 1*d* the functional diagram of FIG. 1*a*, in which the guide element is at a turning point of force application.

FIG. 1*c* shows the functional diagram of FIG. 1*a*, in which the guide element 200 is in a second movement position P2 (Position 2), in which the guides 200 have already been pushed a little further in the closing movement direction D by the application of force by a user, so that the lever arms 110, 110' on the rising guides 210, 210' have been pushed even further towards their upper ends 220, 220'. In this movement position P2, a respective gap G, G' is created between the stops 120, 120' and the locking element 300, so that its longitudinal displaceability is released. In this movement position P2, the plunger 250 of the guide element 200 provides the locking element 300 with a movement coupling between the guide element 200 and the locking element 300.

Figure 1D:
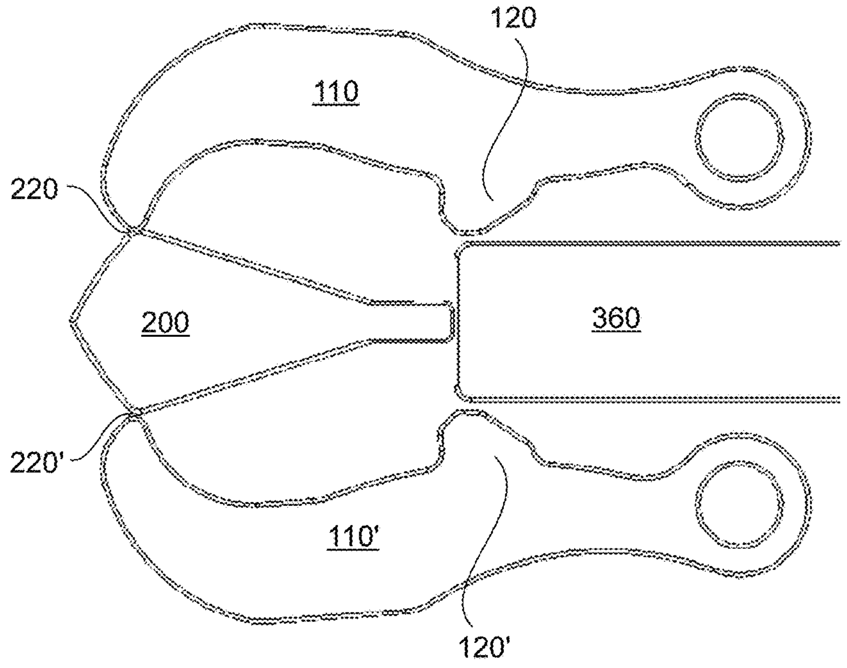

FIG. 1*d* shows the functional diagram of FIG. 1*a*, in which the guide element 200 is at a turning point of force application, which is located at the upper ends 220, 220' of the rising guides 210, 210'. To close the door, the user therefore only has to work against the force of the lever arms 110, 110' between the movement position P1 and the turning point of the application of force 220, 220' (soft close). At the turning point of the application of force 220, 220', the locking element 300 has already been moved back to the left by a part of the width of the stops 120, 120' until just before the lead-in chamfers 130, 130'.

Figure 1E:
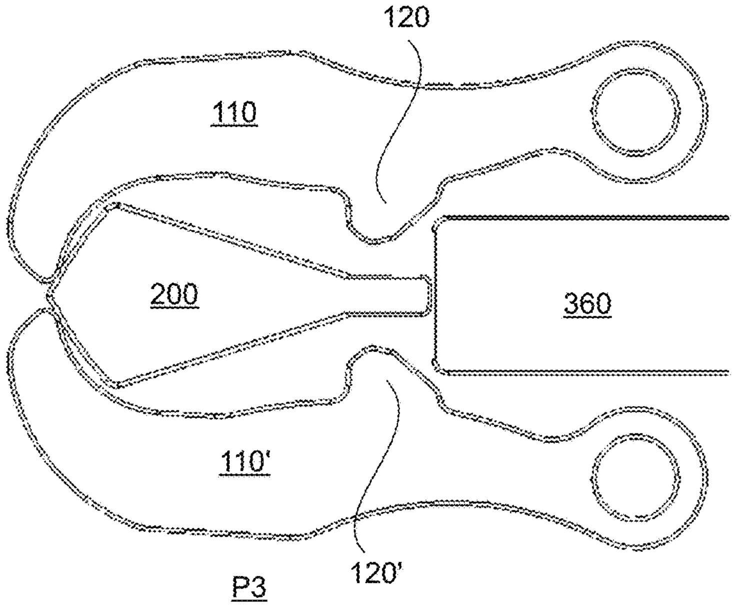

FIG. 1*e* shows the functional diagram of FIG. 1*a*, in which the guide element 200 is in a third movement position P3 (Position 3), in which it has finally been fully engaged behind by the lever arms 110, 110' and the door lock mechanism has been locked. For this purpose, the locking element 300 has been moved to the left by the plunger 250 to such an extent that the stops 120, 120' come free and a pincer movement of the lever arms 110, 110' is no longer blocked, so that these have slid down along the falling guides 24, 240' and have pulled the guide element 200 towards them (locking position). The user no longer needs to apply any force for this process, as it is carried out by the spring action of the lever arms 110, 110' themselves.

Figure 2:
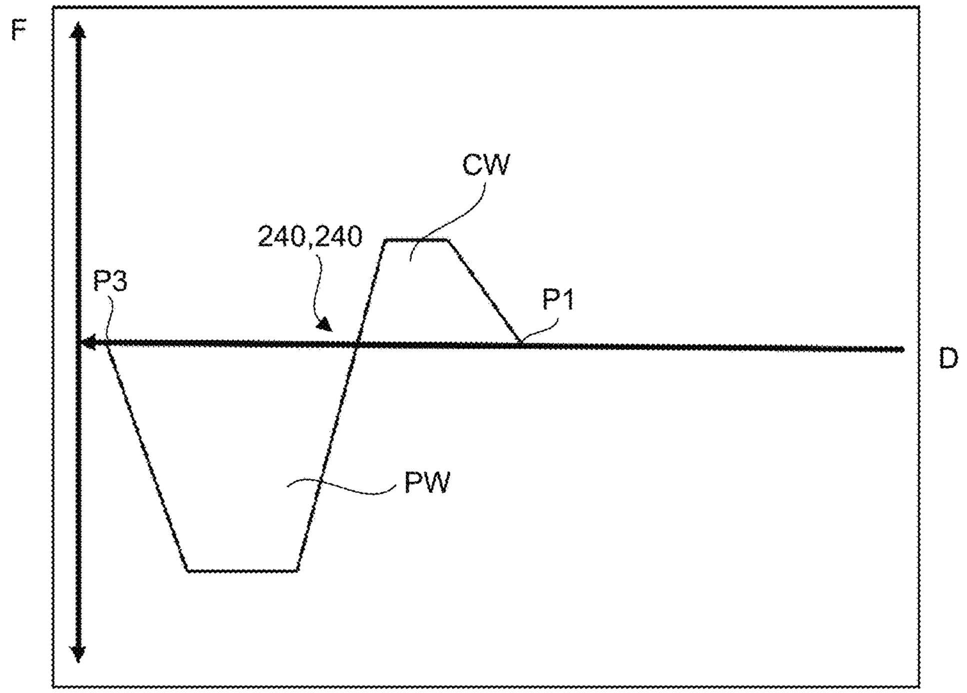
FIG. 2 a diagram explaining the force required to close a door lock mechanism according to the invention.

FIG. 2 shows a diagram explaining the force required to close a door lock mechanism 100 according to the invention. The ordinate indicates a positive or negative force F (force) required to operate the door lock mechanism 100, while the abscissa indicates the associated movement position of the guide 200 (closing movement direction D to the left). Accordingly, if the gate 200 is moved from the movement position P1 to the upper end 240, 240' of the rising guide 210, 210', the user must apply a closing/opening work (force×distance) corresponding to the area CW (Close Work). The movement of the guide 200 from this point to the locking position P3, on the other hand, no longer requires any force from the user, but is applied by the suspension of the lever arms 110, 100' themselves, which allows the lever arms 110, 110' to grip behind the guide 200 and pull it between them. The locking/unlocking work applied for this purpose is indicated by the area PW (Pull Work).

A comparison of surfaces CW and PW shows that the user has to exert considerably less effort to close the dishwasher door (soft close). At the same time, safe and reliable locking of the door is ensured by the use of the spring-loaded lever arms 110, 110'. The resilience of the locking element 300 can be selected in such a way that it only ensures that it is reset to block the lever arms 110, 110' and has no further influence on their closing force, which could jeopardise a secure closing position behind the guide 200.

By blocking the lever arm movement in the open position and releasing the entire lever travel for the locking process, a relatively low closing force can be realised, which has to be applied by the user himself, without this having any effect on the pulling force and the pulling travel.

In principle, the locking element 300 does not necessarily have to be spring-mounted. The locking element 300 can also be reset against the stops 120, 120' by means of a motion coupling with the guide, in which the latter grips the locking element 300 in the direction of opening movement in a separable manner, for example via a hook or magnet, and pulls it back to the locking position to the left.

Overall, this provides a door lock mechanism 100 that is simple in design, safe to operate and reliable in closing, offering the user a "soft close" function without any other restrictions.

LIST OF REFERENCE SIGNS

100 Door lock mechanism
110, 110' Lever arm
120, 120' Projecting stop
130, 130' Lead-in chamfer
200 Guide element
210, 210' Rising guide
220, 220' Upper end of the rising guide (turning point of force application)
230, 230' Lower end of the rising guide 240, 240' Falling guide
250 Plunger
300 Locking element
A1 Angle of the rising guide against its direction of movement
A2 Angle of the falling guide with its direction of movement
A3 Included angle between rising and falling guide
B Closing movement direction
CW Closing/opening work
F Actuating force
G, G' Gap between locking element and lever arm
P1 First movement position
P2 Second movement position
P3 Third movement position
PW Locking/unlocking work
X1, X1' Pivoting axes of the lever arm

What is claimed is:

1. A door lock mechanism for a domestic appliance, the door lock mechanism having a guide element which can be engaged behind by at least one pivotable, resiliently mounted lever arm for locking a door of the domestic appliance, characterized by a displaceably mounted locking element which, depending on a movement position of the locking element, can block or release the at least one lever arm in a pivoting position, such that:

in a first movement position of the guide element, the at least one lever arm contacts a rising guide of the guide element rising against a closing movement direction of the guide element closer to an upper end of the rising guide than to a lower end of the rising guide;

in a second movement position of the guide element, the at least one lever arm contacts the guide element even closer to the upper end of the rising guide, and a gap is formed between the at least one lever arm and the locking element; and in a third movement position of the guide element, the at least one lever arm contacts a falling guide of the guide element falling against the closing movement direction of the guide element;

wherein the locking element is displaceable by the guide element in at least one of the second movement position and the third movement position.

2. The door lock mechanism according to claim 1, characterized by a release of the at least one lever arm upon movement of the guide element from the second movement position to the third movement position, and a blocking of the at least one lever arm upon movement of the guide element from the second movement position to the first movement position.

3. The door lock mechanism according to claim 1, characterized in that the at least one lever arm has a stop located approximately centrally in a longitudinal direction of the at least one lever arm and projecting in a direction of the locking element for abutment against the locking element.

4. The door lock mechanism according to claim 3, characterized in that the stop is provided with a lead-in chamfer for the locking element, along which the locking element can slide and block the at least one lever arm in a pivoted position.

5. The door lock mechanism according to claim 1, characterized in that the locking element is resiliently mounted against the guide element.

6. The door lock mechanism according to claim 5, characterized in that a resilient force of the at least one lever arm is selected to be stronger than a resilient force of the locking element.

7. The door lock mechanism according to claim 1, characterized in that the locking element can be coupled to the guide element via a magnetic connection.

8. The door lock mechanism according to claim 1, characterized in that an angle of inclination of the rising guide is smaller than an angle of inclination of the falling guide.

9. The door lock mechanism according to claim 8, characterized in that an included angle between the rising guide and the falling guide is between 90° and 130°.

10. The door lock mechanism according to claim 1, characterized in that the at least one lever arm comprises two lever arms which are pivotable about respective pivot axes extending parallel to one another.

11. The door lock mechanism according to claim 1, characterized in that the guide element has a projection for movement coupling with the locking element.

12. The door lock mechanism according to claim 11, wherein the projection comprises a plunger.

13. The door lock mechanism according to claim 1, characterized in that the guide element has a polygonal cross-section.

14. The door lock mechanism according to claim 13, wherein the polygonal cross-section is triangular or quadrangular.

15. The door lock mechanism according to claim 14, wherein in being quadrangular, the polygonal cross-section is diamond-shaped.

16. The door lock mechanism according to claim 1, characterized in that the guide element has a round or semi-circular cross-section.

17. A dishwasher comprising the door lock mechanism of claim 1.

18. A method for locking and unlocking a door of a domestic appliance with the door lock mechanism according to claim 1, in which the at least one pivotable, resiliently mounted lever arm is blocked against the displaceably mounted locking element, such that:

the at least one lever arm, during movement of the guide element towards the at least one lever arm, contacts the rising guide, which rises against the closing movement direction of the guide element, closer to the upper end of the rising guide than to the lower end of the rising guide;

on further movement of the guide element towards the at least one lever arm, the gap between the at least one lever arm and the locking element is opened; and on still further movement of the guide element in which the at least one lever arm contacts the falling guide of the guide element, which is adjacent to the rising guide and falling against the closing movement direction of the guide element, the locking element is displaced by the guide element.

19. The method according to claim 18, characterized in that, by displacing the locking element, the at least one lever arm is released when the door lock mechanism is closed and is blocked when the door lock mechanism is opened.

* * * * *